US011727832B2

(12) United States Patent
Bailey

(10) Patent No.: US 11,727,832 B2
(45) Date of Patent: Aug. 15, 2023

(54) SYSTEM AND METHOD FOR DISPLAYING CONTENT ON UTILITY POLES

(71) Applicant: Thomas Tracy Bailey, Fairhope, AL (US)

(72) Inventor: Thomas Tracy Bailey, Fairhope, AL (US)

(*) Notice: Subject to any disclaimer, the term of this patent is extended or adjusted under 35 U.S.C. 154(b) by 224 days.

(21) Appl. No.: 17/175,424

(22) Filed: Feb. 12, 2021

(65) Prior Publication Data

US 2021/0248936 A1    Aug. 12, 2021

Related U.S. Application Data

(60) Provisional application No. 62/975,264, filed on Feb. 12, 2020.

(51) Int. Cl.
*G09F 19/22* (2006.01)
*G09F 13/00* (2006.01)
*G06F 16/909* (2019.01)
*G09F 19/14* (2006.01)
*G09F 27/00* (2006.01)
*G06F 16/906* (2019.01)

(52) U.S. Cl.
CPC ............ *G09F 19/22* (2013.01); *G06F 16/906* (2019.01); *G06F 16/909* (2019.01); *G09F 13/005* (2013.01); *G09F 19/14* (2013.01); *G09F 27/004* (2013.01)

(58) Field of Classification Search
CPC ........ G06F 16/906; G06F 16/909; G09F 9/35; G09F 27/004; G09F 19/14; G09F 19/22; G09F 7/18; G09F 13/005; G09F 9/33; G09F 2007/1813
See application file for complete search history.

(56) References Cited

U.S. PATENT DOCUMENTS

2014/0070961 A1* 3/2014 Collar .................... G08G 1/096
340/905
2018/0006362 A1* 1/2018 Williams ............. H05K 5/0247

FOREIGN PATENT DOCUMENTS

JP          2010197915 A  *  9/2010

OTHER PUBLICATIONS

Monoprice, Monoprice 134196 Quad Sided Ceiling Tv Mount Bracket, for Tvs 32 to 65 Inches, Max Weight 66Lbs Per Screen, https://www.amazon.com/Monoprice-134196-Ceiling-Bracket-Inches/dp/B07K81DZZY, 2019—https://camelcamelcamel.com/product/B07K81DZZY, p. 1 (Year: 2019).*

* cited by examiner

*Primary Examiner* — Zhang Lin
(74) *Attorney, Agent, or Firm* — Adams IP, LLC; James Adams; Edward Garner

(57) ABSTRACT

A system and method for displaying advertisements on utility poles is provided. In one aspect, the system allows users to generate revenue by placing advertisements on utility poles. The system generally comprises a display, display mount, processor operably connected to the display, power supply, and non-transitory computer-readable medium coupled to the processor and having instructions stored thereon. The user interface allows users to choose content that may be presented via the displays. Chosen content is transferred to the displays by the processor over a network. The displays may be grouped in ways that allow users to control multiple displays at once. Various permission levels may be used to limit which displays users have access too, allowing various degrees of control for each display of the system.

17 Claims, 8 Drawing Sheets

SYSTEM AND METHOD FOR DISPLAYING CONTENT ON UTILITY POLES

CROSS REFERENCES

This application claims the benefit of U.S. Provisional Application No. 62/975,264, filed on Feb. 12, 2020, which application is incorporated herein by reference.

FIELD OF THE DISCLOSURE

The subject matter of the present disclosure refers generally to a system and method for displaying content using displays mounted to utility poles.

BACKGROUND

Utility poles are a necessary feature of public utilities as it provides an inexpensive way to route cables and wires as well as support utility equipment such as transformers. However, much of the surface area of a utility pole is not used for anything. In this regard, utility poles result in much wasted space. Though it is not uncommon to see flyers posted on utility poles, the laws in many states, cities, and counties differ. This can be confusing to many since it can be difficult to know where a municipality begins and the county ends. For instance, it may not be unlawful to post material on a utility pole in the county, but a certain municipality of the county may have ordinances in place that consider doing so defacement of city owned property. If a person were to post a flyer on a utility pole in an area that didn't have clearly defined boundaries, it might be impossible for that person to know whether or not they were breaking the law.

Additionally, states, counties, and cities are constantly trying to develop new income streams from which to acquire money that may be used to fund government projects. Installing traditional billboards on utility poles would result in large and unruly advertisements structures and would likely interfere with the housing of public utilities, which would entirely defeat the purpose of having utility poles. Having a smaller billboard lower on the utility pole would allow the city to sell that space, but installing multiple traditional billboards would not only require much initial man power, but it would also require much future manpower to change all of the advertisements on the billboards whenever a new contract was entered into. Traditional billboards also don't allow for multiple advertisements to be displayed since they must be changed by hand.

Therefore, there is a need in the art for a system and method that allows states, counties, and municipalities to display advertisements in a way that allows them to generate new income streams.

SUMMARY

A system and methods for displaying advertisements on utility poles is provided. In one aspect, the system allows users to generate revenue by placing advertisements on utility poles. In another aspect, the system allows users to control which user content is displayed on certain displays of the system. Generally, the system allows users to present advertisements via displays mounted to utility poles that otherwise would only function to support public utilities. The system generally comprises a display box, processor operably connected to the display box, power supply, and non-transitory computer-readable medium coupled to the processor and having instructions stored thereon. The system may also comprise a computing entity having a user interface that may allow a user to view data of the system and/or cause the system to perform an action via commands input by said user.

The displays of the system are grouped in a way that allows only certain users control what is presented thereon based on permission levels. Users may further add sub-users to the system who may also have access to the displays but in only a limited capacity. Input devices of the system may provide the system with information concerning events taking place around the display box. Some embodiments of the system may further comprise artificial intelligence, which may be used by the system to monitor content presented on the displays. Artificially intelligence may also be used to analyze data that may indicate which advertisements are most successful.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. As used herein, the term "utility pole" and grammatical equivalents thereof are used herein to mean light poles, electric poles, and other poles that may be used within a municipality to provide services to citizens. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
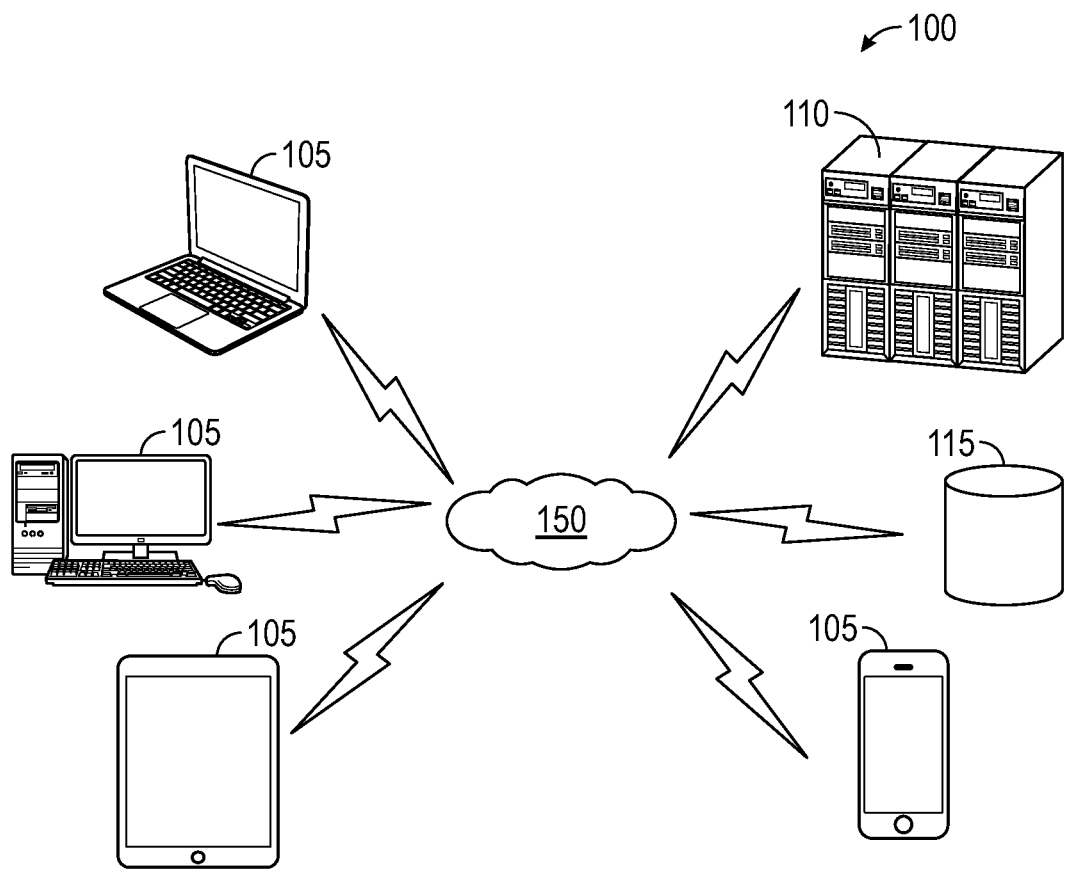
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area 505 and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
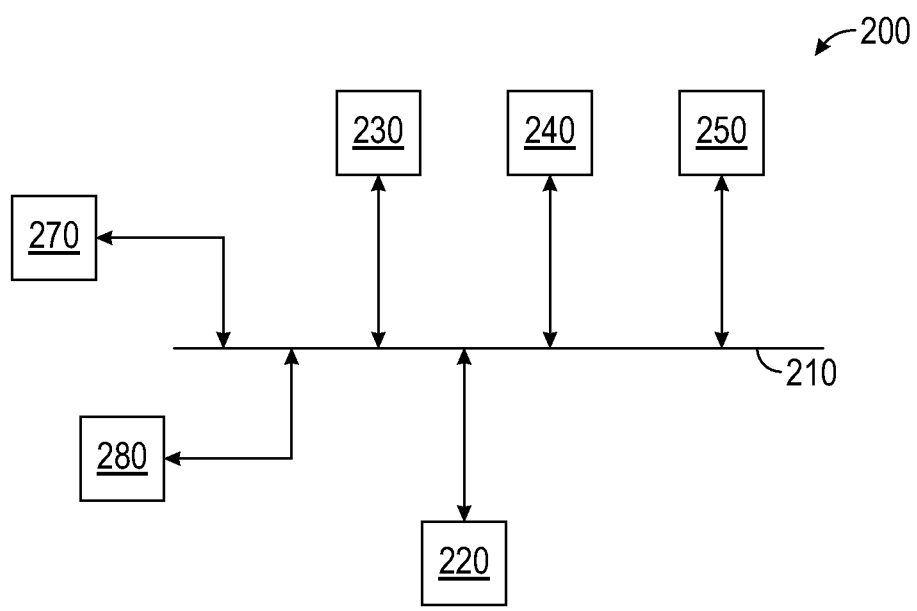
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data 440 from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device 408 and/or an output device. As used herein, an input device 408 may be defined as a device that allows a user 405 to input data and instructions that is then converted into a pattern of electrical signals in binary code that are comprehensible to a computing entity 200. An input device 408 of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
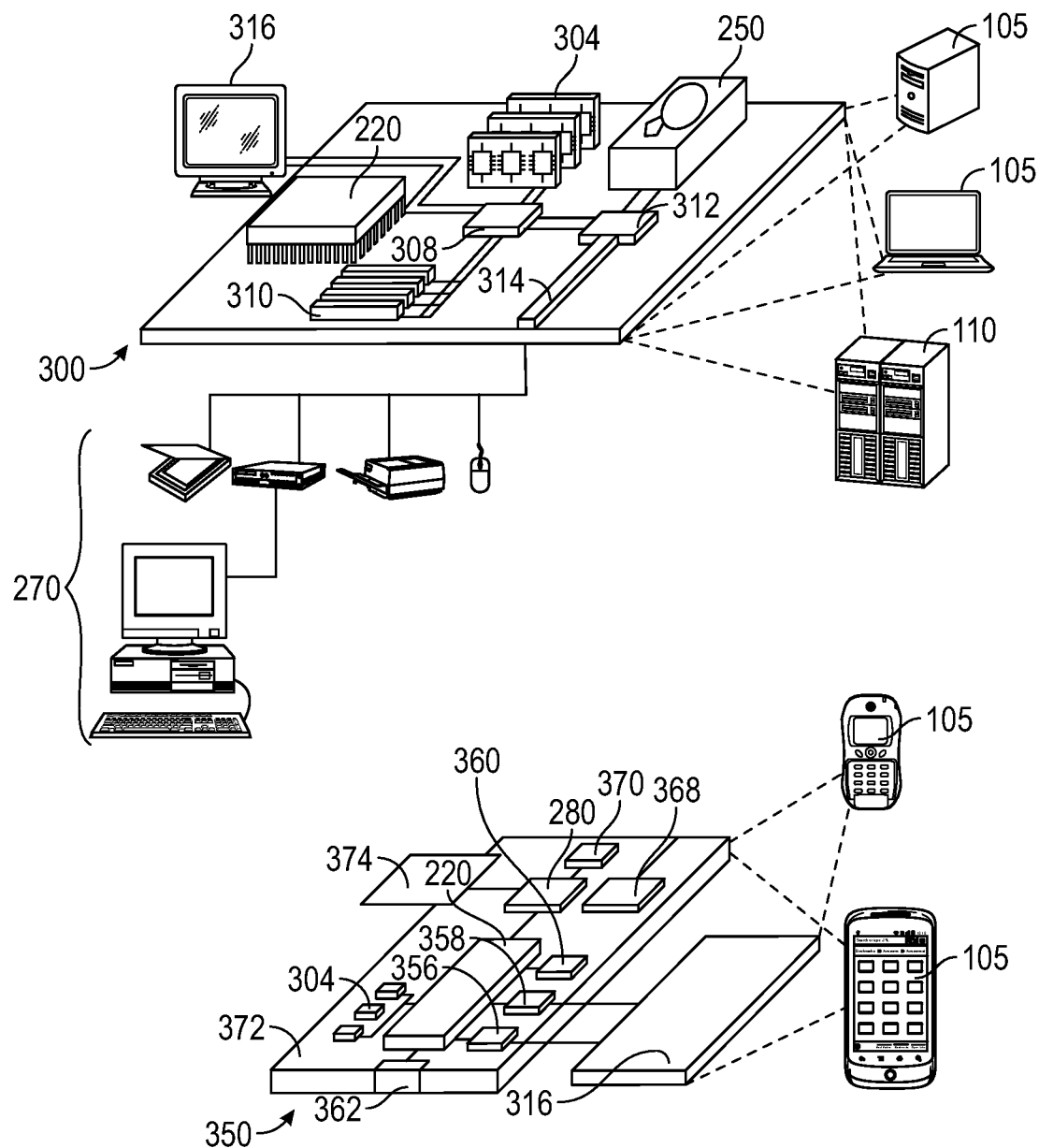
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with electricity. In one preferred embodiment, the system 400 may comprise of multiple power supplies that may provide power to the system 400 in different circumstances. For instance, the system 400 may be directly plugged into a stationary power source, which may provide power to the system 400 so long as it remains in one place. In a preferred embodiment, the stationary power source may be the electrical equipment housed on many utility poles 705 and/or the electricity source providing power to street lights. However, the system 400 may also be connected to a battery so that the system 400 may receive power even when it is not receiving power from a stationary power outlet. In this way, the system 400 may always receive power so that it may continuously update displays 316 with user content 615, 635, 655. In one preferred embodiment, the system 400 may present emergency information when the backup battery is supply power to the system 400. This may provide the public with valuable information in times of crisis. For instance, the system may continue to present amber alert and blue alert information to the public, including names and pictures of any potential perpetrator and/or victim, even when the system's main power supply is not providing power to the system. In a preferred embodiment, the power supply of the system 400 is located on or within the utility pole 705.

Figure 4:
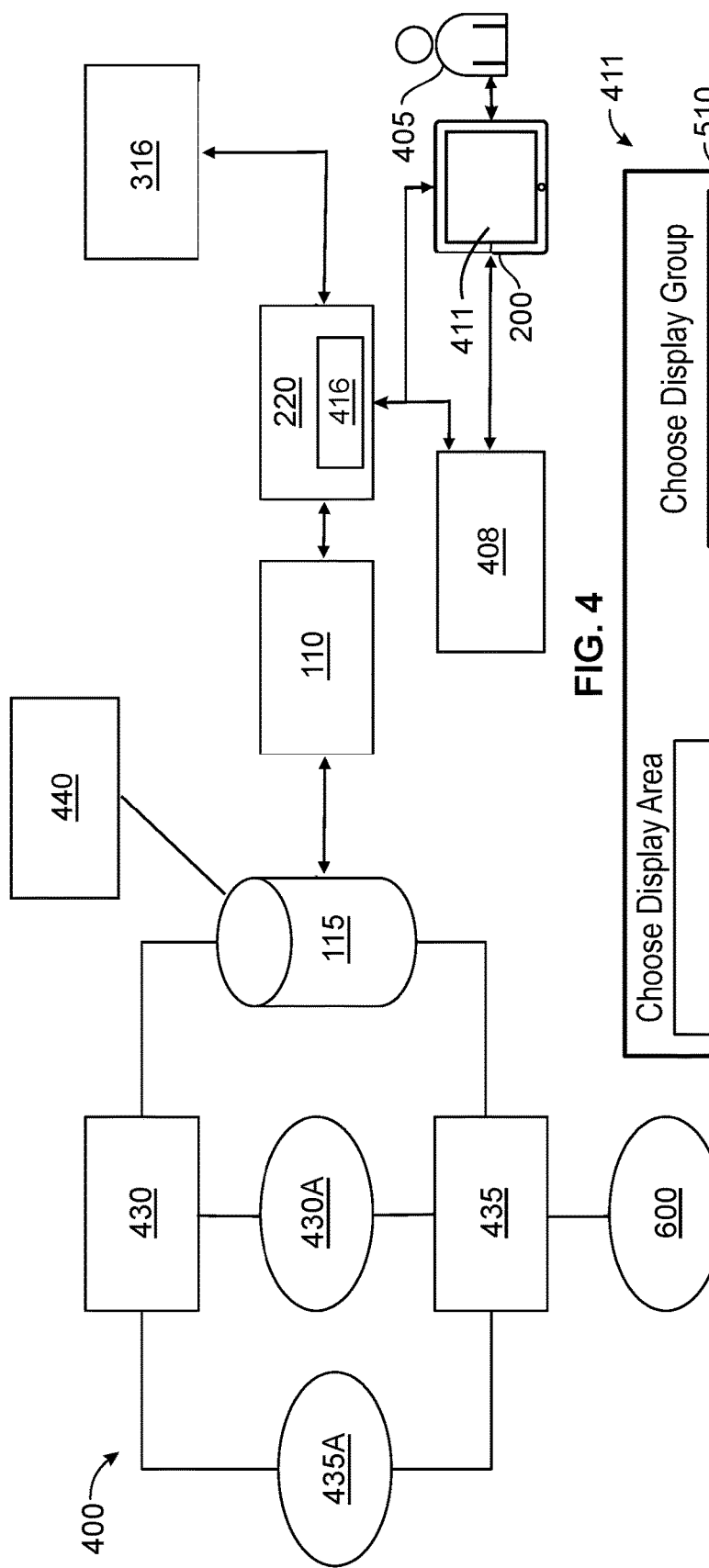
FIG. 4 is a diagram illustrating a system embodying features consistent with the principles of the present disclosure.
Figure 5:
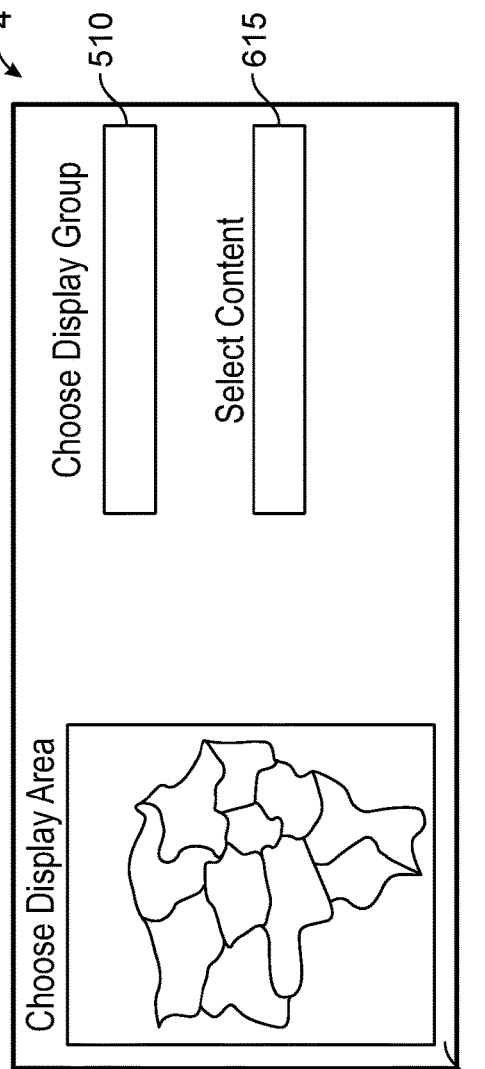
FIG. 5 is a diagram illustrating a user interface embodying features consistent with the principles of the present disclosure.
Figure 6:
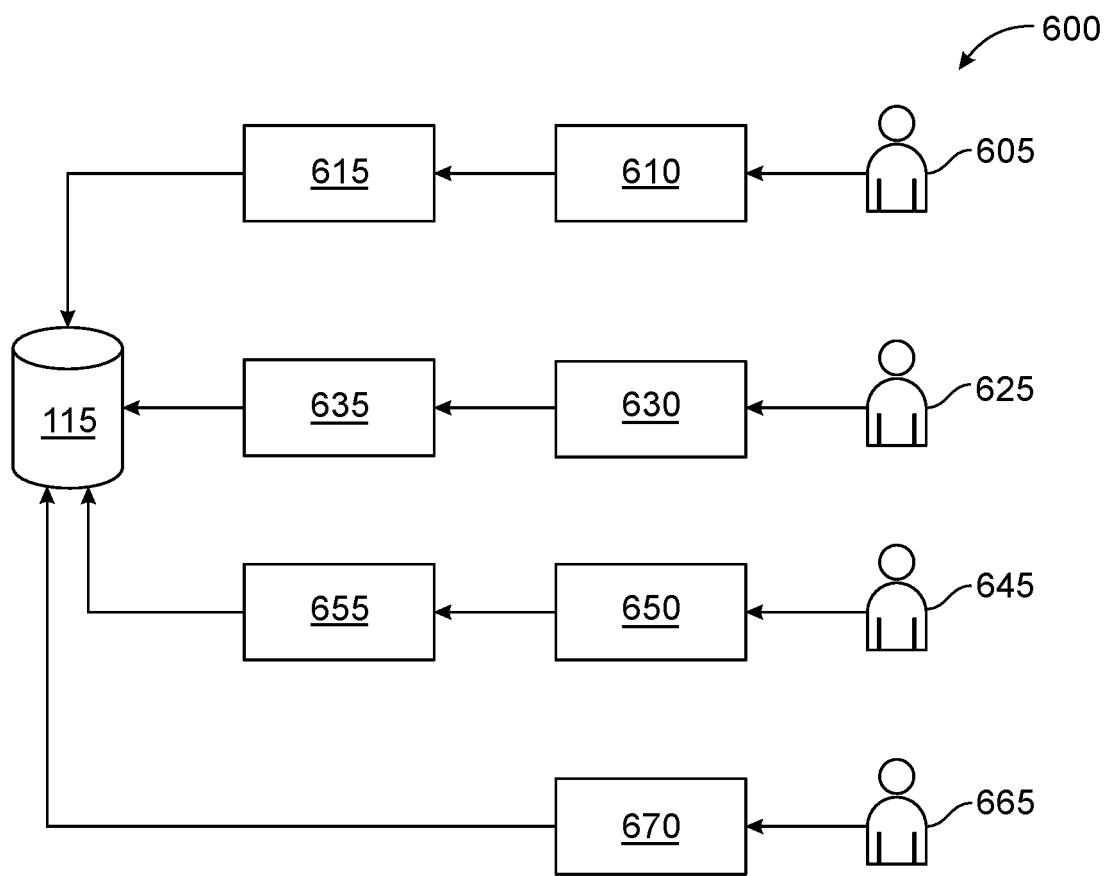
FIG. 6 is a diagram illustrating the manner in which individual access to data may be granted or limited based on permission levels.
Figure 7:
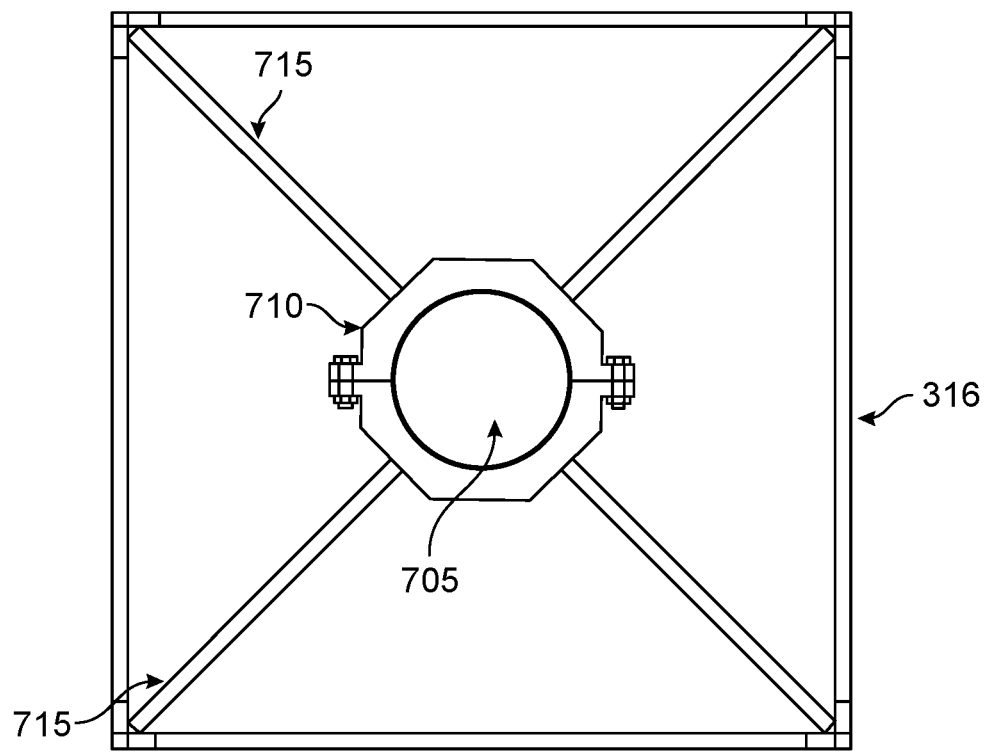
FIG. 7 is a diagram illustrating a system embodying features consistent with the principles of the present disclosure.
Figure 8:
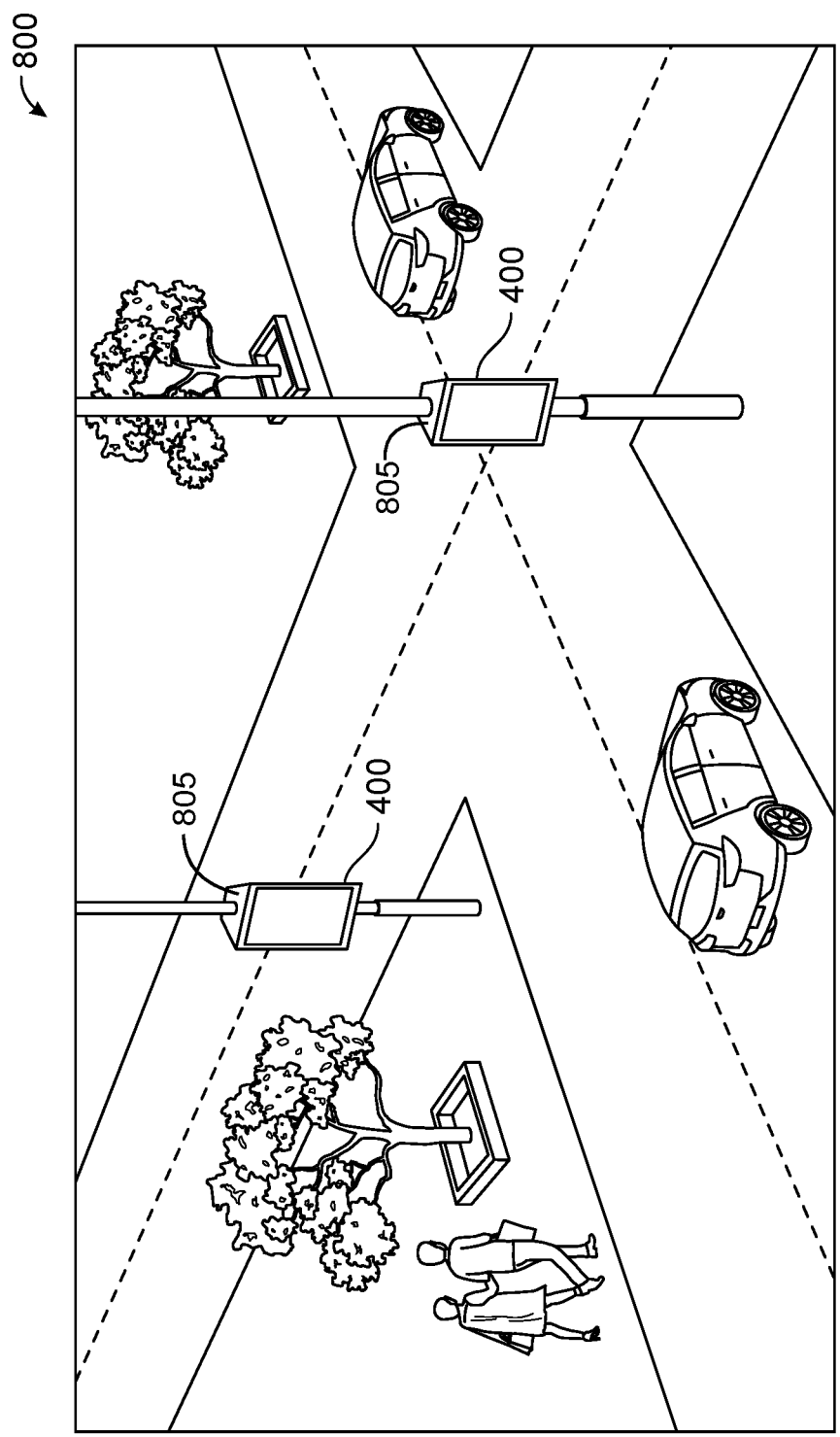
FIG. 8 is an illustration of the system being used within an environment.
Figure 9:
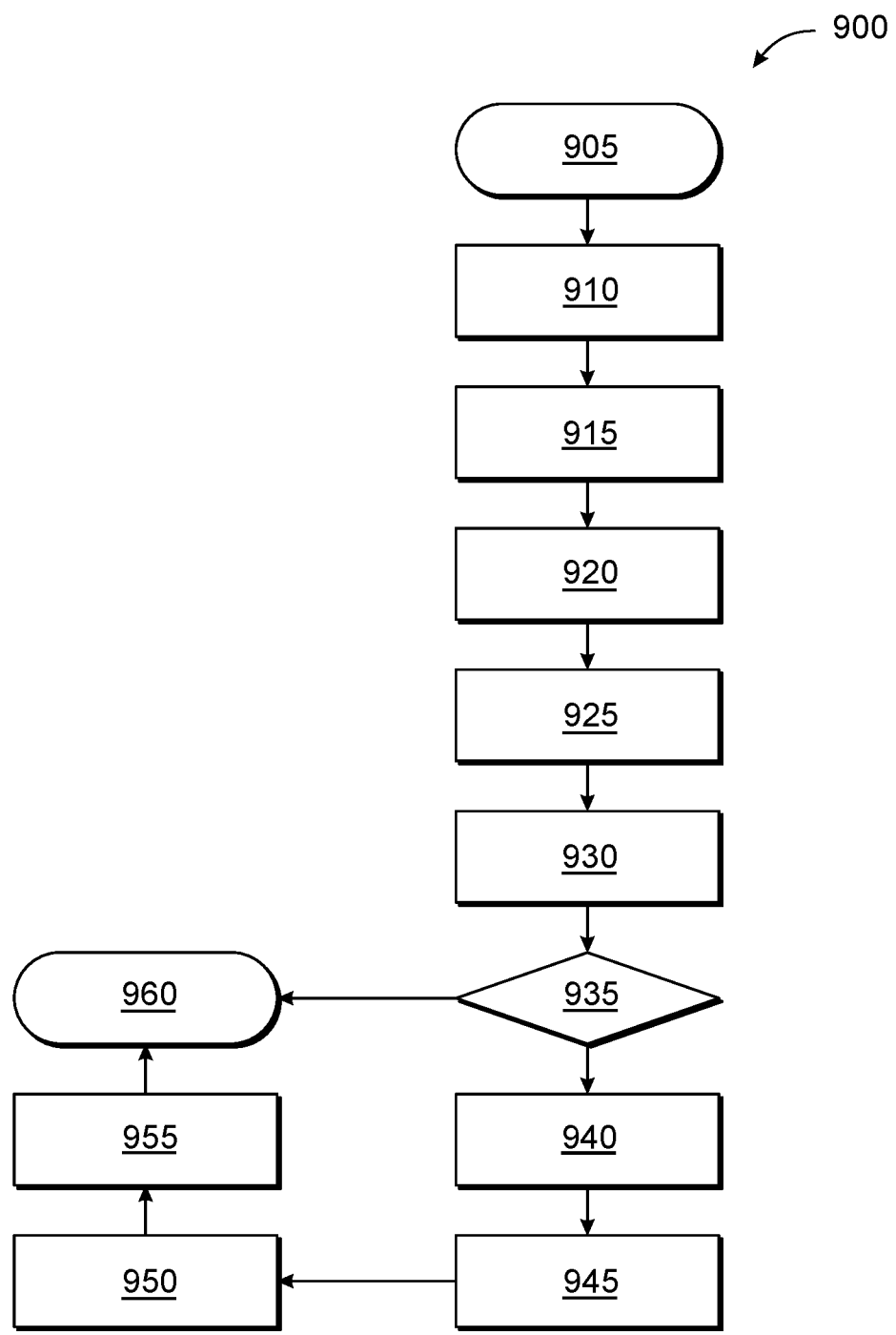
FIG. 9 a diagram illustrating a flow chart illustrating certain method steps of a method embodying features consistent with the principles of the present disclosure.

FIGS. 4-9 illustrate embodiments of a system 400 for presenting advertisements via displays 316 mounted to a utility pole 705. FIG. 4 depicts a preferred embodiment of a system 400 designed to present advertisements via grouped displays 316. FIG. 5 illustrates an embodiment of a user interface 411 of the system 400. FIG. 6 illustrates permission levels 600 that may be utilized by the present system 400 for controlling access to content 615, 635, 655 of the system 400. FIG. 7 illustrates the system 400 attached to a utility pole 705. FIG. 8 illustrates the system 400 being used within an environment 500. FIG. 9 illustrates a method that may be carried out by the system 400. It is understood that the various method steps associated with the methods of the present disclosure may be carried out as operations by the system 400 depicted in FIG. 4.

As illustrated in FIG. 4, the system 400 generally comprises a display box, processor 220 operably connected to the display box, power supply, and non-transitory computer-readable medium 416 coupled to the processor 220 and having instructions stored thereon. The display box comprises a display mount 700 and display 316. In some preferred embodiments, the display box may further comprise a fitting 805, which may create an enclosed space about a utility pole 705. The system 400 may also comprise a computing entity 200, wherein said computing entity 200 may comprise a user interface 411 that may allow a user 405 to view data of the system 400 and/or cause the system 400 to perform an action via commands input by said user 405. In another embodiment, the system 400 may comprise a database 115 operably connected to the processor 220, which may be used to store user data 430A and display data 435A therein. In yet another preferred embodiment, a server 110 may be operably connected to the database 115 and processor 220, facilitating the transfer of information between the processor 220 and database 115. Although represented as a single server 110 and database 115 in FIG.

4, it is understood that multiple servers 110 and databases 115 may be used without departing from the inventive subject matter herein.

The system 400 preferably transmits user data 430A to a display 316 so that it may be presented. In particular, the system 400 is designed to allow users 405 to control which user data 430A is transmitted to displays 316 for presentation. For instance, as illustrated in FIG. 8, displays 316 may be mounted to utility poles 705 along sidewalks and streets in a downtown urban setting so that public notices, advertisements, and nearby restaurant menus may be presented to the general public. For instance, displays 316 may be mounted to lighting poles in parking lots of grocery and/or big box stores in a way such that weekly specials may be presented to customers as they park and/or walk to the store. For instance, displays 316 may be mounted about interstates to alert drivers of weather advisories or emergency situations A display 316 may be defined as an output device that communicates data that may include, but is not limited to, visual, auditory, cutaneous, kinesthetic, olfactory, and gustatory, or any combination thereof. Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of a visual representation of display data 435A via a liquid crystal display (LCD), wherein the hard copy of the visual representation of display data 435A may be stored on a local hard drive. For instance, a display 316 may present a soft copy of audio information via a speaker, wherein the hard copy of the audio information is stored on a flash drive. For instance, a display 316 may present a soft copy of user data 430A, wherein the hard copy of the user data 430A is stored within a database 115. Displays 316 may include, but are not limited to, cathode ray tube monitors, LCD monitors, light emitting diode (LED) monitors, gas plasma monitors, screen readers, speech synthesizers, haptic suits, speakers, and scent generating devices, or any combination thereof, but is not limited to these devices.

As mentioned previously, the processor 220 is configured to perform the operations disclosed herein based on instructions stored within the system 400. In an embodiment, the programming instructions responsible for the operations carried out by the processor 220 are stored on a non-transitory computer-readable medium 416 ("CRM"), which may be coupled to the server 110, as illustrated in FIG. 4. Alternatively, the programming instructions may be stored or included within the processor 220. Examples of non-transitory computer-readable mediums 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 416.

Data within the system 400 may be stored in various profiles. In a preferred embodiment, the system 400 comprises user data 430A and display data 435A that may be stored in user profiles 430 and cluster profiles 435. User data 430A may be defined as data that may be used to identify a particular user 405 of the system 400. User data 430A may include, but is not limited to, name, date of birth, address, geolocation, advertisement, or any combination thereof. Display data 435A may be defined as data that may be used to identify a particular display of the system 400. Display data 435A may include, but is not limited to, geolocation data, display name, display descriptions, or any combination thereof. User data 430A and display data 435A may allow users 405 to control cluster profiles 435 of the system 400 so that they may monetize their ability to advertise on the displays 316 of said cluster profile 435.

A user profile 430 may be defined as a profile containing data about a particular user 405. The system 400 may separate user profiles 430 into groups 510 and subgroups (or user roles 610, 630, 650). In a preferred embodiment, various groups 510 and subgroups of the system 400 may grant permissions that give users 405 access to data and/or displays 316 within the system 400. For instance, the user profile 430 of a user 405 who is a municipal worker may be granted permissions that allows the municipal worker to access all displays 316 within the municipality. A user profile 430 of a sub-user who owns a business in the municipal worker's jurisdiction may be granted permissions that grant the businessman access to displays 316 within the municipal user's 405 jurisdiction by placing the sub-user in a group 510. Therefore, a user 405 of the system 400 may change what displays 316 of the system 400 a sub-user may access by changing permissions of the sub-users. In one preferred embodiment, the system 400 may store both user data 430A and display data 435A in user profiles 430, which may allow the system 400 to associate a particular user 405 with a particular display 316.

A cluster profile 435 may be defined as a profile containing data about a particular collection of displays 316. In a preferred embodiment, a cluster profile 435 may comprise of one or more cluster profiles 435, wherein each cluster profile 435 within the plurality of cluster profiles 435 may represent at least one display 316 that may be associated with a particular user 405. For instance, a user 405 having permissions to control content 615, 635, 655 on all displays 316 within a geographic area 505 may have a cluster profile 435 that contains data on all displays 316 within said geographic area 505. For instance, a user 405 having permissions to control content 615, 635, 655 on all displays 316 within a geographic area 505 may divide said geographic area 505 so that the displays 316 within said geographic area 505 are separated into multiple cluster profiles 435. In one preferred embodiment, displays 316 may be added to multiple cluster profiles 435. Cluster profiles 435 may be sorted into groups 510 and subgroups, which may assign different permission levels 600 to the cluster profiles 435. The permission levels 600 may be used by the system 400 to determine which users 405 may post user content 615, 635, 655 on the displays 316. For instance, cluster profiles 435 grouped in the "public" group 510 may allow the general public to post information on the displays 316 of said cluster profile 435. For instance, cluster profiles 435 grouped in the "advert" group 510 may only grant permissions to users 405 who are paying to post information on the displays 316 of said cluster profile 435. In one preferred embodiment, cluster profiles 435 may store display data 435A and user data 430A, which may allow the system 400 to track which users 405 are posting information on which displays 316.

As illustrated in FIG. 4, the system 400 may comprise a database 115 operably connected to the processor 220. The database 115 may be operably connected to the processor 220 via wired or wireless connection. In a preferred embodiment, the database 115 is configured to store user data 430A and display data 435A therein. Alternatively, the user data 430A and display data 435A may be stored on the non-transitory computer-readable medium 416. The database 115 may be a relational database such that the user data 430A and display data 435A associated with each user profile 430 and cluster profile 435 within the plurality of user profiles 430 and cluster profiles 435 may be stored, at least in part, in one or more tables. Alternatively, the database 115 may be an object database such that user data 430A and display data 435A associated with each user profile 430 and cluster profile 435 within the plurality of user profiles 430 and cluster profiles 435 may be stored, at least in part, as objects. In some instances, the database 115 may comprise a relational and/or object database and a server 110 dedicated solely to managing the user data 430A and display data 435A in the manners disclosed herein.

As mentioned previously, one embodiment of the system 400 may further comprise a computing entity 200 operably connected to the processor 220. A computing entity 200 may be implemented in a number of different forms, including, but not limited to, servers 110, multipurpose computers, mobile computers, etc. For instance, a computing entity 200 may be implemented in a multipurpose computer that acts as a personal computer for a user 405, such as a laptop computer. For instance, components from a computing entity 200 may be combined in a way such that a mobile computing entity 200 is created, such as mobile phone. Additionally, a computing entity 200 may be made up of a single computer or multiple computers working together over a network. For instance, a computing entity 200 may be implemented as a single server 110 or as a group of servers 110 working together over and Local Area Network (LAN), such as a rack server 110 system 400. Computing entities 200 may communicate via a wired or wireless connection. For instance, wireless communication may occur using a Bluetooth, Wi-Fi, or other such wireless communication device.

In an embodiment, the system 400 may further comprise a user interface 411. A user interface 411 may be defined as a space where interactions between a user 405 and the system 400 may take place. In a preferred embodiment, the interactions may take place in a way such that a user 405 may control the operations of the system 400, and more specifically, allow a user 405 to monitor the content 615, 635, 655 presented on displays 316 of the system 400. A user 405 may input instructions to control operations of the system 400 manually using an input device 408. For instance, a user 405 may choose to alter the content 615, 635, 655 presented via displays 316 of the system 400 by using an input device 408 of the system 400, including, but not limited to, a keyboard, mouse, or touchscreen. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 411 to the user 405 via a display operably connected to the processor 220.

In a preferred embodiment, users 405 may access data of the system 400 via the user interface 411, which may be accomplished by causing the processor 220 to query the non-transitory computer-readable medium 416 and/or database 115. The non-transitory computer-readable medium 416 and/or database 115 may then transmit data back to the processor 220, wherein the processor 220 may present it to the user 405 via a display. This information may be presented to the user 405 in a way such that the user 405 may choose whether or not to present the data via said display. The user interface 411 may also allow the user to choose how the system will present data via the display. In one preferred embodiment, the system may present data via the display using a spilt screen to display multiple pieces of user content at once or as a single screen to present a single piece of user content via the displays. A user may choose how to present this data via an option of user interface 411. The user interface 411 may also allow users of the system to present multiple pieces of user content via multiple displays of a cluster profile at one time, wherein each display within the plurality of displays of the cluster profile may or may not be presenting the same piece of content.

The user interface 411 may also allow a user 405 to control displays 316 of the system 400. For instance, a user 405 may turn off a display operably connected to the system 400 via the user interface 411 if the display is presenting information from an alternative source due to hacking. In another preferred embodiment, the system 400 may allow a user 405 to choose cluster profiles 435 that allow a user 405 to choose multiple displays 316 in an area through which to display content 615, 635, 655. For instance, a cluster profile 435 comprising displays 316 located within an area code may be chosen by a user 405 so that the user 405 may present content 615, 635, 655 via all displays 316 within the area code. In yet another preferred embodiment of the system 400, an administrator may use the user interface 411 to permit other users 405 to present chosen content 615, 635, 655 using the system 400. For instance, an administrator may allow a user 405 to present an ad displaying a product but not allow a user 405 to present pornographic material.

In another preferred embodiments, the system 400 may use artificial intelligence (AI) techniques to monitor data of the system 400. The term "artificial intelligence" and grammatical equivalents thereof are used herein to mean a method used by the system 400 to correctly interpret and learn from data of the system 400 or a fleet of systems 400 in order to achieve specific goals and tasks through flexible adaptation. Types of AI that may be used by the system 400 include, but are not limited to, machine learning, neural network, computer vision, or any combination thereof. The system 400 preferably uses machine learning techniques to learn the subject of content to determine if a user 405 should be allowed to present that material on a display 316, wherein the instructions carried out by the processor 220 for said machine learning techniques are stored on the CRM 416, server 110, and/or database 115. Machine learning techniques that may be used by the system 400 include, but are not limited to, regression, classification, clustering, dimensionality reduction, ensemble, deep learning, transfer learning, reinforcement learning, or any combination thereof.

The system 400 may use more than one machine learning technique to learn the subject of content 615, 635, 655 to determine if a user 405 should be allowed to present that material on a display 316. For instance, the system 400 may use a combination of natural language processing and reinforcement learning to discern what is being expressed in the audio data and deduce the events taking place in the image data of content 615, 635, 655 a user 405 is attempting to present to determine if said content 615, 635, 655 contains subject matter that could be deemed inappropriate. For instance, the system 400 could monitor the audio data for language that could be deemed inappropriate by the regulations of a municipality, county, state, and/or federal agency. In some preferred embodiments, the system 400 may use machine learning techniques to deduce the overall message of content 615, 635, 655 a user 405 is attempting to present to determine if the overall meaning of the content 615, 635, 655 could be deemed inappropriate. For instance, the system 400 may determine that though the audio data and video data taken separately do not contain any inappropriate subject matter, the conveyed message of the content 615, 635, 655 (when the audio data and video data of the content 615, 635, 655 are taken together) does contain inappropriate subject matter.

In another preferred embodiment, the system 400 may further comprise an input device 408 configured to collect input data 440 that allows users 405 to monitor conditions about the system 400. The input devices 408 used to by the system to collect input data 440 are preferably a camera and microphone. Cameras may relay input data 440 in the form of image data to the system 400 while microphones may relay input data 440 in the form of audio data to the system 400. For instance, a municipality having said system 400 installed on light poles about its downtown area may have cameras associated with display boxes located at intersections. For instance, a municipality having said system 400 installed parks may have microphones associated with the display boxes that collect audio data that may indicate whether a certain decibel level has been reached. Image data collected by the system is preferably in the form of pictures or video, which may be monitored by users 405 of the system 400 via the user interface. In one preferred embodiment, image data and audio data may be stored in databases 115 for later use. For instance, police may later examine image data and audio data of the system 400 to track a suspect during commission of a crime or to track a suspect after the crime has been committed. In another preferred embodiment, the system 400 may comprise an emergency switch that may allow citizens to alert users 405 of the system 400 of an emergency situation, including the exact geolocation of the emergency. For instance, an emergency operator may be alerted of an accident via the emergency switch and then use the image data of the system 400 to dispatch the appropriate emergency personnel to the scene.

In one preferred embodiment, the system 400 may use AI to determine what events are taking place around a display box of a system 400 based on input data 440 collected by the input device 408 of a display box. Some preferred embodiments may further have the system 400 take an action based on said determination. For instance, the system 400 may use natural language processing and deep learning to determine that an automobile accident has occurred at an intersection in which a display box having an input device 408 collecting input data 440 is located. The processor 220 may then send out a computer readable signal to emergency personnel to alert said emergency personnel of an accident. For instance, the system 400 may use reinforcement learning to deduce that video data collected by a camera of a display box is showing a robbery taking place and subsequently send law enforcement officers the information regarding said robbery. For instance, the system 400 may use facial pattern recognition techniques to identify suspects within input data 440 and then alert authorities as to the location of said suspects.

As illustrated in FIG. 7, the display box may be attached to the utility pole 705 via the display mount 700. In a preferred embodiment, the display mount 700 comprises a pole mount 710 and mounting arms 715, which may be combined in a number of ways to create a frame that can create a display box having three or more sides as displays 316. A first end of the mounting arms 715 are connected to the pole mount 710 and the other end may be attached to a display. Display mounts 700 may comprise one or more control arms. In a preferred embodiment, the mounting arms 715 may be used to mount multiple displays 316. For instance, as illustrated in FIG. 7, two display mounts 700 totaling four mounting arms 715 may be used to mount four displays 316. For instance, a display mount 700 having one mounting arm 715 may be used with a display mount 700 having two mounting arms 715 to mount three displays 316 to a utility pole 705, as can be seen in FIG. 8. For instance, two display mounts 700 comprising three control arms each may be used to mount six displays 316 to a utility pole 705. This may allow a number of displays 316 of varying sizes to be mounted to a single utility pole 705. For instance, three display mounts 700 comprising one mounting arm 715 each may be used to mount three displays 316 to a utility pole 705.

In a preferred embodiment, as illustrated in FIG. 8, the display box may further comprise a fitting 805 that attaches to the displays 316 and/or display mount 700, wherein a fitting 805 is a rigid sheet formed in a way such that it also fits securely around the utility pole 705 in order to create an enclosed space. The enclosed space is the area defined by the boundaries created by the displays 316, fittings 805, and utility pole 705. The fitting 805 preferably creates a water tight seal with the displays 316, display mount 700, and/or utility pole 705 in order to protect the electronics positioned within the enclosed space of the display box. In a preferred embodiment, a fitting 805 comprising rubber or silicon creates the seal necessary to prevent water from entering the system 400 while mounted to the utility pole 705. The fitting 805 may also prevent insects, birds, and other creatures from entering the system 400 while mounted to the utility pole 705, further reducing risk to the electronics inside. In one preferred embodiment, an access port of the fitting 805 may grant a user 405 minimal access to the enclosed portion of the system 400 without the user 405 being required to remove an entire fitting 805. This may allow a user 405 to spray the interior of the system 400 with an insecticide, fungicide, etc. that will prevent the system 400 from housing pests or potentially hazardous organisms. Fittings 805 may also be used to prevent vandalism and theft by adding an additional barrier to the internal components of the system. For instance, a computing entity 200 and wireless communication device contained with the enclosed space of the display box having fittings 805 may be protected from potential thieves who can only access said computing entity 200 and wireless communication device by first removing the fittings 805.

To prevent un-authorized users 405 from accessing data within the user profiles 430 and cluster profiles 435 of the system 400, the system 400 may employ a security method. As illustrated in FIG. 6, the security method of the system 400 may comprise a plurality of permission levels 600 that may allow a user 405 to view content 615, 635, 655 within the database 115 while simultaneously denying users 405 without appropriate permission levels 600 the ability to view said content 615, 635, 655. To access the data stored within the database 115, users 405 may be required to make a request via a user interface 411. Access to the data within the database 115 may be granted or denied by the processor 220 based on verification of a requesting user's 605, 625, 645 permission level 600. If the requesting user's 605, 625, 645 permission level 600 is sufficient, the processor 220 may provide the requesting user 605, 625, 645 access to content 615, 635, 655 stored within the system 400. Conversely, if the requesting user's 605, 625, 645 permission level 600 is insufficient, the processor 220 may deny the requesting user 605, 625, 645 access to content 615, 635, 655 stored within the system 400. In an embodiment, permission levels 600 may be based on user roles 610, 630, 650 and administrator roles 670, as illustrated in FIG. 6. User roles 610, 630, 650 allow users 405 to access content 615, 635, 655 that a user 405 has uploaded and/or otherwise obtained through use of the system 400. Administrator roles 670 allow administrators to access system 400 wide data, including managerial permissions, as well as assign new tasks to other users 405.

In an embodiment, user roles 610, 630, 650 may be assigned to a user 405 in a way such that a requesting user 605, 625, 645 may access user profiles 430 and cluster profiles 435 via a user interface 411. To access the data within the database 115, a user 405 may make a user request via the user interface 411 to the processor 220. In an embodiment, the processor 220 may grant or deny the request based on the permission level 600 associated with the requesting user 605, 625, 645 assigned via user roles 610, 630, 650. Only users 405 having appropriate user roles 610, 630, 650 or administrator roles 670 may access the content 615, 635, 655. For instance, as illustrated in FIG. 6, requesting user 1 605 has a permission level 600 to view user 1 content 615 whereas requesting user 2 625 has a permission level 600 to view user 1 content 615, user 2 content 635, and user 3 content 655. Alternatively, content 615, 635, 655 may be restricted in a way such that a user 405 may only view a limited amount of content 615, 635, 655. For instance, requesting user 3 645 may be granted a permission level 600 that only allows them to view user 3 content 655 related to a particular display 316. Therefore, the permission levels 600 of the system 400 may be assigned to users 405 in various ways without departing from the inventive subject matter described herein.

FIG. 9 provides a flow chart 900 illustrating certain, preferred method steps that may be used to carry out the method of displaying content 615, 635, 655 on a display 316 attached to a utility pole 705. Step 905 indicates the beginning of the method. During step 910, the user 405 may select a cluster profile 435 associated with their user profile 430 via the user interface 411. The processor 220 may then query the database 115 to acquire display data 435A during step 915 and subsequently present it to the user 405 via the display during step 920. The user 405 may choose which displays 316 they would like to present user content 615, 635, 655 on during step 925. Once the user 405 has chosen the displays 316, the system 400 may perform a query to determine user content 615, 635, 655 within the system 400 that they may be presented via said display during step 930. Based on the results of the query, the processor 220 may perform an action during step 935. If the system 400 determines no user content 615, 635, 655 may be presented on the chosen displays 316, the system 400 may proceed to terminate method step 960. If the system 400 determines that there is user content 615, 635, 655 that may be presented, the system 400 may retrieve the content 615, 635, 655 and present it to the user 405 via the user interface 411 during step 940.

The user 405 may choose which user content 615, 635, 655 to present via the displays 316 during step 945 before proceeding to step 950, wherein the system 400 may subsequently transmit the user content 615, 635, 655 to the selected displays 316 for presentation. During step 955, the displays 316 may receive the user content 615, 635, 655 and present the user content 615, 635, 655 to the public. Once the data has been presented, the system 400 may proceed to the terminate method step 960. In one preferred embodiment, user content 615, 635, 655 must be approved by an administrator 665 of the system 400 before being presented via a display 316. If an administrator 665 rejects the selected user content 615, 635, 655 of a user 405, the system 400 may ask the user 405 to choose other user content 615, 635, 655 to present via the displays 316.

Figure 10:
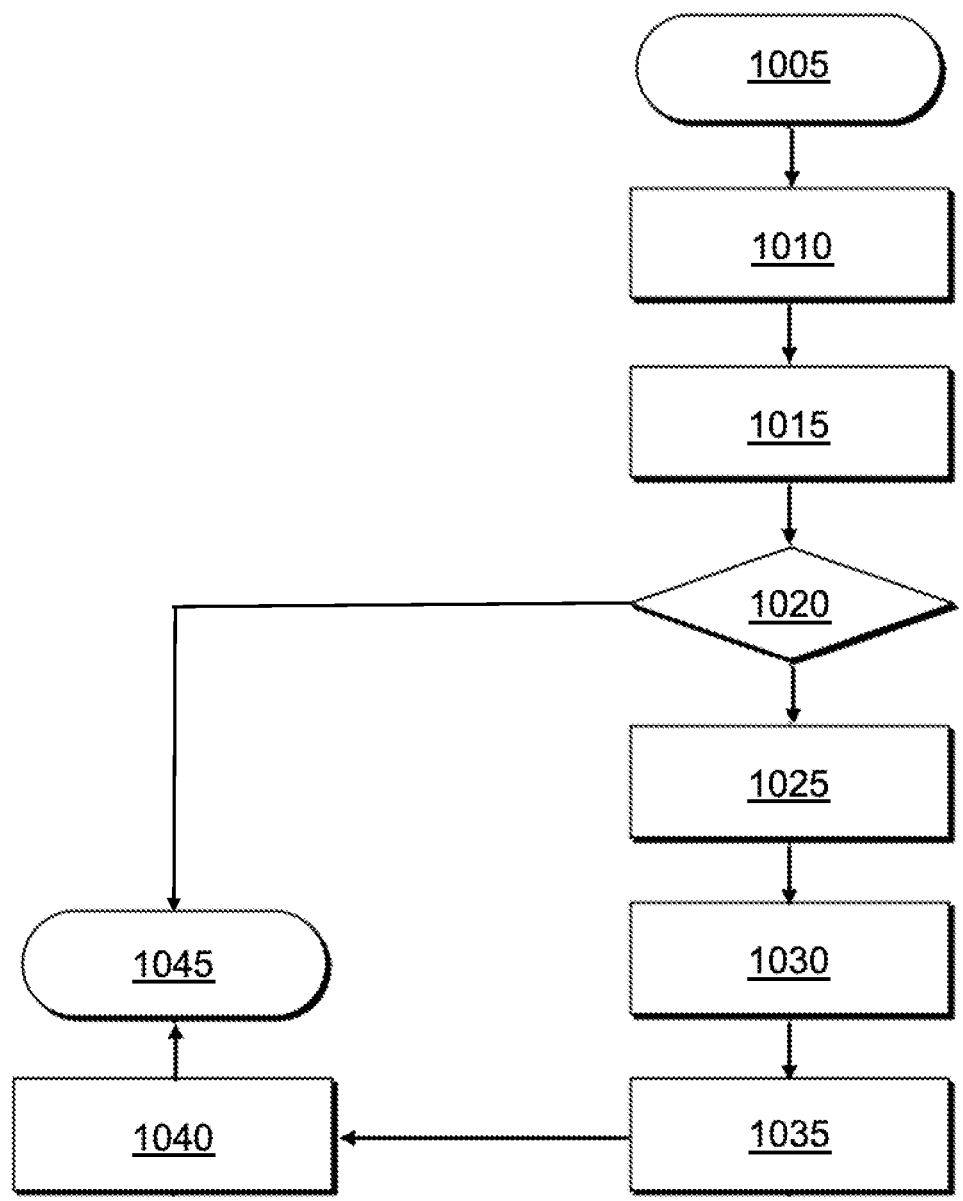
FIG. 10 a diagram illustrating a flow chart illustrating certain method steps of a method embodying features consistent with the principles of the present disclosure.

FIG. 10 provides a flow chart 1000 illustrating certain, preferred method steps that may be used to carry out the method of installing a display box on a utility pole 705. Step 1005 indicates the beginning of the method. During step 1010, the user 405 may obtain a utility pole 705. The user 405 may then evaluate the utility pole 705 and the foundation to ascertain whether they are capable of supporting a display box during step 1015. Evaluation of the foundation and utility pole 705 may include, but is not limited to, assessing the max weight capacity of the foundation and/or utility pole 705, determining the geological characteristics on which the foundation has settled, and determine the maximum wind loading capacity of the utility pole 705, or any combination thereof. Based on the outcome of the determination, the user 405 may perform an action during step 1020. If the user 405 determines that the utility pole 705 cannot support a display box, the user 405 may proceed to the terminate method step 1045. If the user 405 determines that the utility pole 705 and its foundation can support and display box, the user 405 may proceed to step 1025.

During step 1025, the user 405 may obtain at least one pole mount 705, display 316, and display arms 710 coinciding with a particularly sized display box. In a preferred embodiment, the user 405 may obtain components of a display box based on the evaluation performed in step 1015. For instance, the user 405 preferably obtains components of a display box based having characteristics that will allow the utility pole 705 and its foundation to support said display box. For instance, the width and length of a display 316 of the display box may be contingent on the wind loading capacity of the utility pole 705. In another preferred embodiment, a user 405 must take display 316 visibility into account when obtaining components of a display box. For instance, a display box mounted to a utility pole 705 next to a sidewalk may have smaller displays 316 than a display box mounted to a utility pole 705 along the interstate since those viewing the displays 316 of the display box from the sidewalk will likely be closer than those viewing the displays 316 of the display box from the interstate. Once the display box has been obtained, the user 405 may secure the at least one pole mount 705 and display arms 710 to the utility pole 705 during step 1030. The mounting height of said display box on a utility pole 705 is preferably between six feet and twenty feet from the base of said utility pole 705, wherein the base may be defined as the point at which a utility pole 705 is in contact with a geological surface feature, such as the ground or the surface of the water.

The user 405 may connect then attach the display 316 to the control arms during step 1035. In a preferred embodiment, only one display 316 is attached to the control arms; however, the display box may comprise a plurality of displays 316 without departing from the inventive subject matter described herein. Once the display 316 has been installed, the user 405 may connect a power supply to the display box during step 1040, providing the display box with power. The power supply is preferably a continuous power supply, such as a direct power source. Once the power supply has been connected to the display box, the user 405 may proceed to install the terminate method step 1045. In some preferred embodiments, a user 405 must obtain permission from a municipality, county, state, or federal agency having jurisdiction over said utility pole 705 prior to securing the at least one pole mount 705 and display arms 710 to said utility pole 705. This will allow a user 405 to ensure that they are conforming to any codes/regulations the utility pole 705 may be subject to. Other preferred embodiments may require a user to install a fitting 805 to the displays 316, display mount 700, and/or utility pole 705 prior to proceeding to the terminate method step 1045.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for presenting content on utility poles comprising:
a plurality of displays secured to a plurality of utility poles,
wherein said plurality of displays are secured to said plurality of utility poles via a display mount having a pole mount and at least three control arms,
wherein said pole mount is secured around each utility pole of said plurality of utility poles,
wherein said at least three control arms are centrally aligned with said utility pole,
wherein said at least three control arms are secured to said pole mount and project away from said utility pole,
wherein said at least three control arms secure each display of said plurality of displays to said display mount,
a processor operably connected to said plurality of displays,
a wireless communication device operably connected to said plurality of displays and said processor,
a power supply that is at least one of supported by said utility pole and inside of said utility pole,
wherein said power supply is operably connected to said plurality of displays, processor, and wireless communication device, and
a non-transitory computer-readable medium coupled to said processor,
wherein said non-transitory computer-readable medium contains instructions stored thereon, which, when executed by said processor, cause said processor to perform operations comprising:
determining a permission level of each user of a plurality of users,
determining which displays of said plurality of displays is an authorized display,
wherein said authorized display is one or more of said displays of said plurality of displays that said user of said plurality of users has authority in which to display chosen content based on said permission level,
receiving said chosen content from said processor,
receiving a chosen display from said processor,
wherein said chosen display is said authorized display selected by said user to present chosen content, determining, by use of machine learning techniques, whether said chosen content is appropriate based on at least one of regulations of a municipality, county, state, and federal agency, transmitting said chosen content to said chosen display of said plurality of displays, and presenting said chosen content via said chosen display after it has been determined that said chosen content is appropriate.

2. The system of claim 1, further comprising an input device operably connected said processor, wherein said input device collects input data entered by a user, wherein said processor uses said input data to select said chosen content.

3. The system of claim 1, further comprising a computing device operably connected to said processor and having a user interface, wherein said user interface allows said plurality of users to choose saved content to present on said plurality of displays as chosen content.

4. The system of claim 3, wherein said user interface allows said plurality of users to choose which display of said plurality of displays to present said content.

5. The system of claim 4, further comprising a database operably connected to said processor, wherein said saved content is stored within said database, wherein said user interface is configured in a way such that said plurality of users may access said saved content that is stored within said database.

6. The system of claim 4, further comprising a plurality of cluster profiles associated with said plurality of displays, wherein said plurality of displays are associated with said plurality of cluster profiles based on a geographic area, wherein said user interface is configured in a way such that said user may select a cluster profile of said plurality of cluster profiles so that said plurality of displays of said cluster profile may present said chosen content selected by said user.

7. The system of claim 6, wherein said user interface is configured in a way such that a user may select said cluster profile of said plurality of cluster profiles so that said plurality of displays of said cluster profile may present said chosen content selected by said user.

8. A system for presenting content on utility poles comprising:

a plurality of displays secured to a plurality of utility poles via an enclosed display box, wherein said enclosed display box is secured around a utility pole of said plurality of utility poles, wherein a water tight seal of said enclosed display box is positioned between said enclosed display box and a utility pole of said plurality of utility poles when said enclosed display box is secured to said utility pole, wherein at least three control arms of said enclosed display box are configured to project away from said utility pole and be centrally aligned with said utility pole, wherein said at least three control arms secure said plurality of displays to said utility pole, wherein said plurality of displays make up at least one side of said enclosed display box, a processor operably connected to said plurality of displays, a power supply that is at least one of supported by said utility pole or inside of said utility pole, wherein said power supply is operably connected to said plurality of displays and said processor, a computing device operably connected to said processor and having a user interface, wherein said user interface allows a plurality of users to choose content to present on said plurality of displays, wherein said user interface allows said plurality of users to choose which display of said plurality of displays to present said content, and a non-transitory computer-readable medium coupled to said processor, wherein said non-transitory computer-readable medium contains instructions stored thereon, which, when executed by said processor, cause said processor to perform operations comprising:

determining a permission level of each user of said plurality of users, determining which displays of said plurality of displays is an authorized display, wherein said authorized display is one or more of said plurality of displays of said plurality of displays that said user of said plurality of users has authority in which to display chosen content based on said permission level, wherein said chosen content is said content selected by a plurality of users, receiving said chosen content from said computing device, receiving a chosen display from said computing device, wherein said chosen display is said authorized display selected by said user to present chosen content, and transmitting said chosen content to said chosen display of said plurality of displays.

9. The system of claim 8, a wireless communication device operably connected to said plurality of displays and said processor.

10. The system of claim 8, wherein said non-transitory computer-readable medium contains additional instructions, which, when executed by said processor, cause said processor to perform additional operations comprising:

determining, by use of machine learning techniques, whether said chosen content is appropriate based on at least one of regulations of a municipality, county, state, and federal agency.

11. The system of claim 10, wherein said non-transitory computer-readable medium contains said additional instructions, which, when executed by said processor, cause said processor to perform said additional operations comprising:

presenting said chosen content via said chosen display after it has been determined that said chosen content is appropriate.

12. The system of claim 8, further comprising an input device operably connected said processor, wherein said input device collects input data entered by a user, wherein said processor uses said input data to select said chosen content.

13. The system of claim 8, further comprising a computing device operably connected to said processor and having a user interface, wherein said user interface allows said plurality of users to choose saved content to present on said plurality of displays as chosen content.

14. The system of claim 13, wherein said user interface allows said plurality of users to choose which display of said plurality of displays to present said content.

15. The system of claim 14, further comprising a database operably connected to said processor, wherein said saved content is stored within said database, wherein said user interface is configured in a way such that said plurality of users may access said saved content that is stored within said database.

16. The system of claim 14, further comprising a plurality of cluster profiles associated with said plurality of displays, wherein said plurality of displays are associated with said plurality of cluster profiles based on a geographic area, wherein said user interface is configured in a way such that said user may select a cluster profile of said plurality of cluster profiles so that said plurality of displays of said cluster profile may present said chosen content selected by said user.

17. The system of claim 16, wherein said user interface is configured in a way such that a user may select said cluster profile of said plurality of cluster profiles so that said plurality of displays of said cluster profile may present said chosen content selected by said user.

\* \* \* \* \*